United States Patent [19]

Chiku et al.

[11] 4,021,255
[45] May 3, 1977

[54] SINTERED BETA-ALUMINA ARTICLE PERMEABLE TO SODIUM AND POTASSIUM IONS AND METHODS FOR PRODUCING SAME

[75] Inventors: Takewo Chiku, Toyota; Kiyoshi Ninomiya, Nagoya; Takashi Yoshida, Nagoya; Takeshi Kogiso, Nagoya; Hiroaki Hayashi, Nagoya; Noboru Matsui, Konan, all of Japan

[73] Assignee: Kabushiki Kaisha Toyota Chuo Kenkyusho, Japan

[22] Filed: Feb. 14, 1975

[21] Appl. No.: 549,915

Related U.S. Application Data

[63] Continuation of Ser. No. 327,172, Jan. 26, 1973, abandoned.

[52] U.S. Cl. .................. 106/73.4; 106/65; 264/61; 264/65
[51] Int. Cl.² .......................... C04B 35/10
[58] Field of Search ............. 106/39.7, 73.4, 63, 106/65; 264/61, 65, 56

[56] References Cited

UNITED STATES PATENTS

| | | | |
|---|---|---|---|
| 3,446,677 | 5/1969 | Tennenhouse | 264/61 |
| 3,625,773 | 12/1971 | Charles | 264/61 |
| 3,671,324 | 6/1972 | Iwai et al. | 264/61 |
| 3,687,735 | 8/1972 | Inoue | 264/61 |
| 3,707,589 | 12/1972 | Chiku et al. | 264/61 |

Primary Examiner—Robert F. White
Assistant Examiner—John Parrish
Attorney, Agent, or Firm—Berman, Aisenberg & Platt

[57] ABSTRACT

A beta-alumina polycrystal article permeable to sodium and potassium ions made by sintering β-alumina and tantalum. The article evidences high corrosion resistance against sodium, potassium and their ions, and is especially useful as a solid electrolyte for a sodium-sulfur battery because of its excellent durability.

9 Claims, 6 Drawing Figures

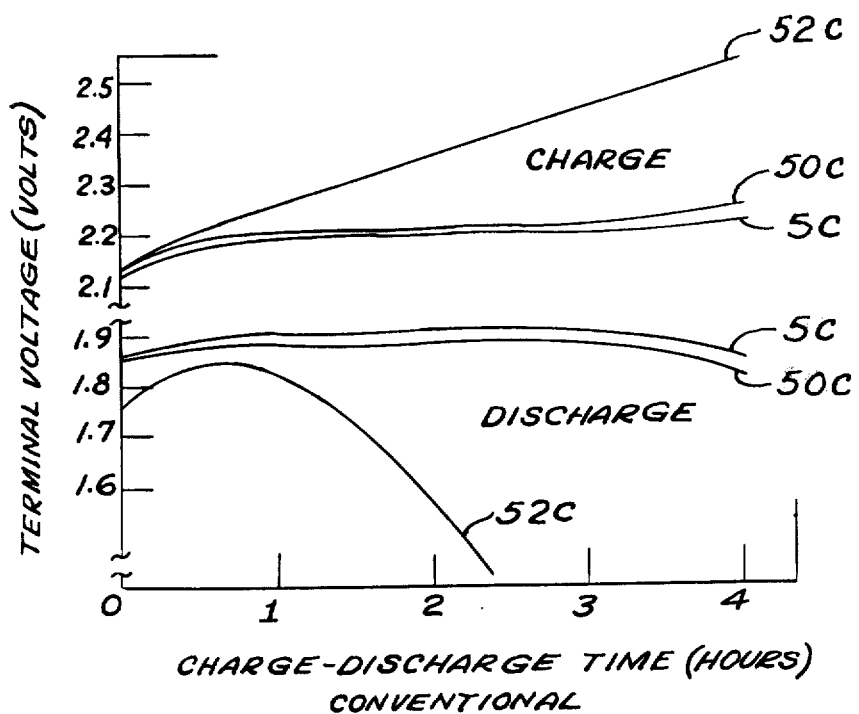
FIG. 2.
CONVENTIONAL

FIG. 4.
CONVENTIONAL

SINTERED BETA-ALUMINA ARTICLE PERMEABLE TO SODIUM AND POTASSIUM IONS AND METHODS FOR PRODUCING SAME

This is a continuation application of application Ser. No. 327,172, filed Jan. 26, 1973, now abandoned.

BACKGROUND OF THE INVENTION

The present invention relates to a sintered beta-alumina article permeable to sodium and potassium ions and method for producing same. The article consists of a $\beta$- alumina polycrystal sintered body including tantalum which can be used as a solid electrolyte or membrane for a sodium-sulfur storage battery, or the like.

Beta-alumina is a crystalline material of hexagonal structure having the chemical formula of $Na_2O.11Al_2O_3$, and it possesses the characteristic that sodium ions can be selectively moved therethrough in the direction perpendicular to C-axis of the crystal. The special resistance of the movement of sodium ions in said direction is about $3.5\Omega$ cm at the temperature of 300° C. It is also known that a beta-alumina polycrystal sintered article, obtained by sintering beta-alumina single crystal powder, has the same ion-permeability as said single crystal material, and sodium ions move through said article in an electric field. Therefore, a beta-alumina polycrystal sintered article (hereinafter, the article wll be called a beta-alumina sintered article) is used as a sodium ion-permeable article such as a solid electrolyte in a sodium-sulfur storage battery in which molten sodium is employed as a negative electrode and molten surfur is employed as a positive electrode.

A sodium-sulfur battery, based on electromotive reaction, operates as follows: During discharge, sodium ions move toward the positive electrode through the solid electrolyte, and sodium polysulfide is formed at the positive electrode, electrons being supplied thereto through an external circuit.

Therefore, an ion-permeable article employed as a solid electrolyte for such a storage battery, should have a large electric conductivity and a dense structure, and its quality should not change during repeated charging and discharging. However, a conventional beta-alumina sintered body consisting of $Na_2O$, $Li_2O$ and $Al_2O_3$, or of $Na_2O$, $Li_2O$, MgO and $Al_2O_3$ has such drawbacks that when charging and discharging are repeatedly carried out, its ion-permeability is lowered after a relatively short period of time, that is, its function as a solid electrolyte cannot be maintained for a long period of time. The mechanism for moving sodium ions in a beta-alumina sintered body is not well understood, but considering that the sintered body consists of a polycrystal which is a combination of single crystals, it is assumed that sodium ions move in the direction perpendicular to C-axis of the respective single crystals. Since each single crystal in the sintered body forms a grain, sodium ions which have moved perpendiuclarly to the C-axis of one single crystal must pass through a grain in order to reach the adjacent grain. Usually, minute impurities which are pushed out of the crystals as a result of grain growth during sintering are distributed along the grain boundaries. When these impurities are ones which are easily attacked by sodium ions, such as oxides of iron, titanium and silicon, it is assumed that the grain boundaries are gradually damaged while the sodium ions pass therethrough, resulting in the destruction of the boundaries. Using a beta-alumina sintered article as a solid electrolyte for a sodium-sulfur storage battery, it was observed under an electron microscope that the surface of the sintered article was broken and destroyed by repetitive charging and discharging, and it was found that the destruction occurred at the grain boundaries, thus proving the above-mentioned assumption. Although it is desirable that the beta-alumina powder used as the base material for the sintered body be as pure as possible in order to prevent such destruction, it is almost impossible to exclude minute impurities.

SUMMARY OF THE INVENTION

Accordingly, the invention provides a sintered alumina article permeable to sodium and potassium ions which consists of a beta-alumina polycrystal sintered body made essentially of beta-alumina and tantalum, in which the tantalum is positioned mainly at the grain boundaries of the beta-alumina single crystals. As a result, the sintered body evidenced ion-permeability of superior durability under conditions of use for greatly extended periods of time.

Also, the present invention provides a method for making the above product by adding one or more powders of the group consisting of tantalum, tantalum oxide and tantalum hydroxide, to beta-alumina powder, forming the mixed powders into a desired shape and heating to sintering temperature. THe sintering can be carried out at a lower temperature as compared with conventional sintering of beta-alumina, and also beta-alumina powder of large particle diameters can be employed.

It is, therefore, a primary object of the present invention to provide an improved sintered alumina article permeable to sodium and potassium ions, and a method of making the same.

Another object of the present invention is to provide a sintered alumina article which maintains its ion-permeability for a long period of time under condition of use.

It is a further object to provide a sintered alumina article having high corrosion resistance against sodium, potassium and their ions.

A still further object of the invention is to provide a sintered article comprising a beta-alumina polycrystal sintered body consisting essentially of beta-alumina and tantalum, and the method of making same.

Yet another object of the invention is to provide a method for producing a beta-alumina polycrystal sintered body in which tantalum is distributed at the grain boundaries of the beta-alumina single crystals.

Still another object of the invention is to provide a simple, easy and inexpensive method for producing an ion-permeable sintered article of a desired shape.

These and still other objects of the present invention become readily apparent to one skilled in the art from the following detailed description, specific embodiments, and drawings.

BRIEF EXPLANATION OF THE ATTACHED DRAWINGS

FIG. 2 is a similar graph, for comparison with FIG. 1, showing the performance of a sodium-sulfur battery in which a conventional beta-alumina sintered body is used as the solid electrolyte;

FIG. 4 is a photomicrograph similar to that of FIG. 3, but showing the broken surface of a conventional sintered body after completion of its use as a solid electrolyte;

GENERAL DESCRIPTION OF THE PREFERRED EMBODIMENTS

According to the present invention, the sintered article permeable to sodium and potassium ions is a beta-alumina polycrystal sintered body which consists of beta-alumina and 0.1 to 10% (by weight, and the same hereinafter) of tantalum relative to the beta-alumina, said tantalum being mainly distributed at the grain boundaries between beta-alumina single crystals therein. This structure provides excellent durability as the solid electrolyte of the sodium-sulfur storage battery, maintaining ion permeability for long periods of use.

Also, the present invention provides a method for producing the said sintered body, which is characterized in that tantalum containing material selected from the group of tantalum, tantalum oxide and tantalum hydroxide and mixtures thereof is added to beta-alumina powder in the amount of 0.1 to 10% when converted to tantalum relative to the beta-alumina powder, and the resultant mixture is formed to a desired shape and heated to sinter the beta-alumina powder. According to this method, the ion-permeable sintered body having superior durability, as described above, is obtained, and at the same time sintering can be carried out at a temperature lower than that in making a conventional beta-alumina sintered body. Further, beta-alumina powder of a large particle diameter may be employed. Also, the conversion of beta-alumina into alpha-alumina during sintering can be prevented because the sintering temperature may be lowered.

The reason why the sintered body, according to the present invention, has such a superior durability is assumed to be because the tantalum mainly is disposed at the grain boundaries between the beta-alumina single crystals which compose the polycrystal sintered body, so that a strong bond is formed between grains, and because tantalum has high corrosion resistance against sodium or sodium ions, the chemical bonds between tantalum and matrix (beta-alumina) at the grain boundaries are not so easily destroyed.

In the present invention, the amount of tantalum in a beta-alumina polycrystal sintered body is 0.1 to 10% relative to the beta-alumina. When the amount of tantalum is lower than 0.1%, excellent durability is not obtained, and when it is more than 10%, the ion-permeability is decreased. The amount of tantalum, tantalum oxide and/or tantalum hydroxide to be added to beta-alumina powder is 0.1 to 10% when converted to tantalum (that is, considering the weight of the tantalum only in the oxide, or hydroxide).

Figure 3:
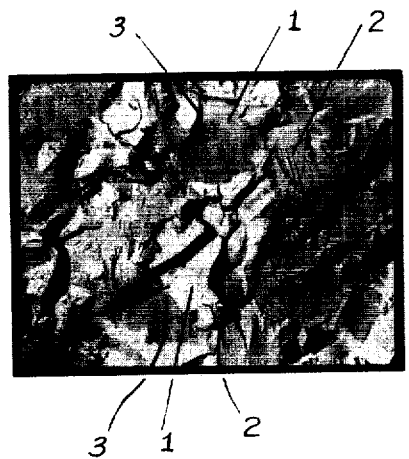
FIG. 3 is a photomicrograph (2500 magnifications) showing the broken surface of the sintered body according to the present invention after completion of its use as a solid electrolyte.

Tantalum in the sintered body may be in the form of the element, or a compound thereof, such as tantalum oxide, or the like, as long as the tantalum weight is within the range of weight percent described above. As a tantalum containing material, a mixture of two or more of the substances, tantalum, tantalum oxide, and tantalum hydroxide may be employed. Although a small amount of tantalum is distributed in a beta-alumina crystal, most of tantalum is distributed at the grain boundaries 3 of the crystal 1 as shown in FIG. 3. This has been observed by EPMA (Electron Prove Microanalyzer) with electron beams as will be described later in discussion of the specific embodiments.

In the present invention, commercially availabe beta-alumina powder may be used as the beta-alumina material. The particle diameter of the powder is not limited, but powder with an average of 1 to 10 $\mu$ particle diameter is perferably employed from the viewpoint that the resultant product is easily formed, which means that powder of a larger particle diameter may be employed as compared with the conventional method in which only beta-alumina powder was used.

Any method may be employed to obtain a desired sintered body. For example, beta-alumina powder and a tantalum containing material are mixed in a mixer, or a ball mill, and the mixture is formed by press dies, or it is made into slurry with water and then it is formed by slip casting. Next, the formed body is heated in a gas, or electric furnace so that the beta-alumina powder is sintered into a polycrystal sintered body. Preferably, the sintering temperature is from 1450° to 1800° C from a viewpoint of the heating operation and the heating period. In the conventional method, not employing a tantalum containing material, the sintering temperature was actually 1650° to 1800° C. So in the present invention, the lower limit of the sintering temperature has been reduced by about 200° C. By lowering the sintering temperature, not only is the sintering more easily performed, but also the undesired conversion of beta-alumina to alpha-alumina ($Al_2O_3$) is prevented. Even at such a lower sintering temperature, the conversion may occur to a slight degree, and so it is preferable that the sintering be carried out in an atmosphere of sodium oxide, or sodium oxide vapor. For example, a formed body of beta-alumina is packed in a mixture of sodium carbonate powder ($Na_2CO_3$) and alpha-alumina powder, and then heated to be sintered. For another example, the vapor which is generated by heating sodium, or sodium compounds such as $Na_2CO_3$, $Na_2O_2$ and $NaAlO_2$ is introduced together with a gas such as air into a sintering furnace in which the formed body of beta-alumina is placed. It is assumed that tantalum is distributed at the grain boundaries of crystals and a part thereof diffuses into the crystals as the sintering proceeds. It is also assumed that most of the tantalum reacts with oxygen in the air to be changed into tantalum oxide ($Ta_2O_5$), and most of tantalum hydroxide decomposes into tantalum oxide by heating and excellent durability can be obtained due to such tantalum or tantalum oxide.

As described above, the present invention can provide a beta-alumina sintered body having superior durability with respect to permeability to sodium ions. Also, the present invention has the same effect with regard to permeability of potassium ions which are similar in character to sodium ions.

Although the preceding description of the invention has been made with respect to Na. beta-alumina having the composition of $Na_2O.11Al_2O_3$, the same description is applicable to K. beta-alumina having the composition of $K_2O.11Al_2O_3$. Namely, in the above description, beta-alumina may be either Na. beta-alumina, or K. beta-alumina. In the latter case, the atmosphere of sodium oxide, or sodium oxide vapor used during sintering is substituted by an atmosphere of potassium oxide, or potassium oxide vapor which is obtained from potassium, $K_2CO_3$, $K_2O_2$, $KAlO_2$ and so on.

SPECIFIC DESCRIPTION OF THE PREFERRED EMBODIMENTS

EMBODIMENT 1

5 grams of tantalum powder having an average particle diameter of 2 $\mu$ was added to 500 grams of beta-alumina powder, the particle diameter thereof being less than 10 $\mu$, and the mixture was ground in a ball mill for 100 hours until a mixed powder having an average particle diameter of about 3 $\mu$ was obtained. The composition of the beta-alumina powder was as follows: $Al_2O_3$, 94.4%; $Na_2O$, 5.2%; $SiO_2$, 0.12%; $CaO$, 0.12%; $Fe_2O_3$, 0.07%; $MgO$, 0.07%; and a minute amount of $TiO_2$.

Figure 5:
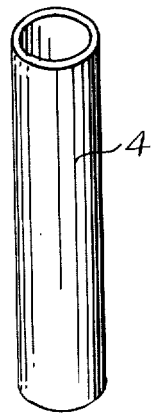
FIG. 5 is a perspective view of the sintered body employed as the solid electrolyte.

20 grams of the obtained mixed powder was put into an isostatic press-forming die made of rubber and pressed under the pressure of 700Kg/cm² to obtain a test tube-shaped body 4, FIG. 5, having one sealed end. Then, the body was packed in a second mixture of powders consisting of alpha-alumina 60% and $Na_2CO_3$ 40% and heated at the temperature of 1600° C for 5 hours in an electric furnace. The sintered body was taken out of the second mixture after cooling. The resultant test tube-shaped sintered body 4 was of white color. The sintered body 4 was of beta-alumina polycrystal having a density of about 3.18g/cm³ and with a wall thickness of about 1mm, an inner diameter of 8mm and a depth of 120mm.

Figure 6:
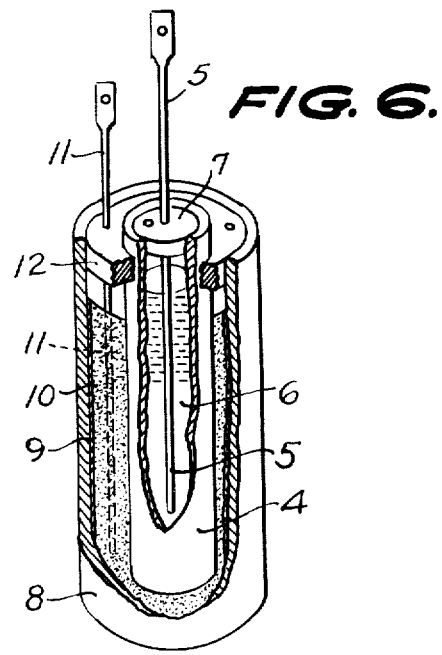
FIG. 6 is a perspective view of the sodium-sulfur storage battery including the sintered body of FIG. 5.

The durability of the sintered body 4 as a solid electrolyte for a sodium-sulfur storage battery was tested by repeated electric charges and discharges. The construction of the storage battery used was as shown in FIG. 6. The sintered body 4 was inserted into the container 8 made of heat resisting glass through the graphite fiber 9 liner as a positive, or cathode, electron collecting substance, and the charging portion of the graphite fiber 9 was filled with sulfur 10 as a cathode active material. The sintered body 4 was filled with sodium 6 as a negative, or anode, active material. Then the cathode electron collecting rod 11 and the anode electron collecting rod 5 were respectively inserted into the active materials through the seals 12 and 7, respectively, made of silicone rubber. In operation, the battery was placed in a heating device (not shown) employing an electric heating wire, and leaving the upper part of the battery outside of the heating device. The battery then was heated so that it functioned under the condition that the sulfur and sodium were melted, and charges and discharges were alternately applied.

Figure 1:
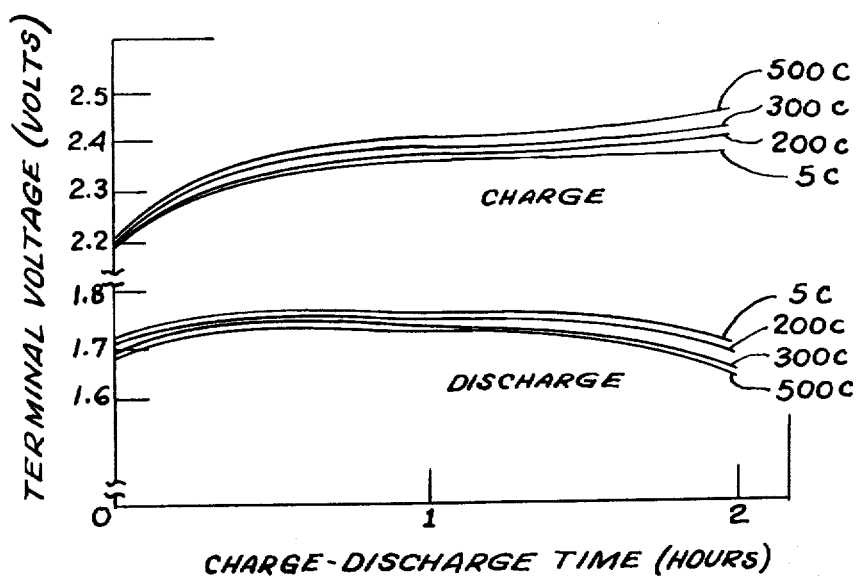
FIG. 1 is a graph showing the performance of a sodium-sulfur battery in which a beta-alumina sintered body according to the present invention is used as the solid electrolyte.

In the above test, the charging and discharging were respectively carried out for two hours, each with the current density of 100 mA/cm² at a temperature of 320° C. Under these conditions, the charge-discharge cycle was repeated, while the terminal voltage against time was measured for each of the cycles. The test results are graphed as shown in FIG. 1 in which the abscissa indicates charge, or discharge time, (hours), while the ordinate shows the terminal voltage (volts) and the charge, or discharge cycles are taken as parameters. The parameters curves are labeled, eg., 5C and 500C to indicate the cycle numbers such as the 5th cycle and the 500th cycle, respectively, and the group of curves in the upper part of the figure shows the charge condition of the battery, while the group of curves in the lower part shows the discharge condition.

For comparison, the same test was performed employing a test tube-shaped sintered body produced with only beta-alumina powder. Namely, the beta-alumina powder was ground and mixed in a ball mill for 400 hours, and the powder was reduced to an average particle diameter of about 0.6 $\mu$. This powder then was press-formed under pressure of 700kg/cm² into a tube-shaped body with one end sealed. The formed body was placed in a mixture of powders of alpha-alumina and $Na_2CO_3$ and heated at a temperature of 1700° C for 10 hours to obtain a beta-alumina sintered body. Next, a sodium-sulfur storage battery was constructed in the same manner as above described, and four hour charging and discharging cycles of the battery were respectively repeated with current density of 50mA/cm² and a battery temperature of 320° C. The resultant graph of test results is shown in FIG. 2.

As is apparent from FIG. 1, when the sintered body according to the present invention is used as a solid elctrolyte, the terminal voltage is somewhat increased during charging and somewhat decreased during discharging with increase in the number of the charge-discharge cycles, but the change is so small that the terminal voltage even at the 500th cycle is nearly equal to the initial value. This means that the permeability of the solid electrolyte is maintained for a long time and its durability is excellent.

As shown in FIG. 2, when the conventional sintered body made of only the beta-alumina powder is employed, the terminal voltage has a similar tendency to that of the present invention as far as the 50th cycle, but at the 52nd cycle the terminal voltage is remarkably increased during charge and extremely lowered during discharge. This shows that the condition of the solid electrolyte is not materially changed until after the 50th charge-discharge cycle, but it is changed at the 52nd charge, such change being attributed to the destruction of the grain boundaries in the sintered body.

Next, the solid electrolyte made of the sintered body according to the present invention and the solid electrolyte made of the conventional sintered body were taken out of their storage batteries after the 500th and 52nd cycle, respectively. Then the sintered bodies were broken and their broken surfaces were observed. FIG. 3 shows a photomicrograph (2500 magnifications) of the broken surface of the sintered body solid electrolyte made of beta-alumina powder with added tantalum according to the present invention, while FIG. 4 shows a similar magnified photomicrograph of the conventional sintered body solid electrolyte made of only beta-alumina powder. As is apparent from FIG. 3, in the solid electrolyte according to the present invention, only the linear transgranular destruction 2 is observed within the respective grains 1 (beta-alumina single crystals). However, in the solid electrolyte made of only beta-alumina powder, not the transgranular, but the intergranular destruction occurs in the grain boundaries and its borken surface is plane (as seen from FIG. 4). From the above, it can be recognized that the sintered body solid electrolyte according to the present invention can endure repeated charge-discharge cycles, i.e., the repeated ion-permeating operations because the addition of tantalum serves to prevent such intergranular destruction.

Further, the broken surface of the sintered body solid electrolyte according to the present invention was observed by EPMA with electron beams. The result was that the peaks of the characteristic X-ray showing the existence of tantalum appeared at the intervals of a few microns ($\mu$). This shows that tantalum exists at high concentration at the gain boundaries, because the grain size of the sintered body is about a few microns. It is assumed that the tantalum exists in the form of $Ta_2O_5$. Thus, it is recognized that tantalum mainly exists at the grain boundaries 3 as shown in FIG. 3.

EMBODIMENT 2

In the same manner as in the Embodiment 1, 10 grams of tantalum oxide powder having a particle diameter of 2 $\mu$ was added to 500grams of beta-alumina powder having a particle diameter of 2 $\mu$, and they were ground and mixed in a ball mill for 24 hours until a mixed powder of average particle diameter of about 1.5 $\mu$ was obtained. In this case, the amount of the added tantalum in the tantalum oxide is 1.6% by weight of the beta-alumina powder.

The mixed powder was then press-formed under the pressure of 1000kg/cm$^2$ into a test tube-shaped body. This body was put into a second mixture of powders comprising alpha-alumina and $Na_2CO_3$, and heated at a temperature of 1500° C for 5 hours to obtain a sintered body, whose density was about 3.16g/cm$^3$, and whose electric conductivity was 25$\Omega$cm at the temperature of 300° C.

Next, a sodium-sulfur storage battery was constructed employing this sintered body in the same manner as described for Embodiment 1, and charging and discharging were repeated respectively at the temperature of 300° C with a current density of 100mA/cm$^2$ for 2 hours. As with the first embodiment, test results on the body formed in the second embodiment showed that the performance of the battery at the 500th cycle was nearly equal to that of the initial condition.

EMBODIMENT 3

40 grams of tantalum hydroxide (Ta(OH)$_5$) powder was added to 500 grams of the same beta-alumina powder as in the second embodiment, and the powders were ground and mixed in a ball mill for 24 hours until a mixed powder having an average particle diameter of about 1.5 $\mu$ was obtained. In this case, the amount of the tantalum in the tantalum hydroxide was slightly more than 5% of the beta-alumina powder, by weight.

Next, the mixed powder was press-formed under the pressure of 1000 kg/cm$^2$ into a test tube-shaped body. This body was heated in a powder mixture of alpha-alumina and $Na_2CO_3$ at a temperature of 1600° C for 5 hours to obtain a sintered body, whose density was about 3.22 g/cm$^3$.

Then, a sodium-sulfur storage battery, as in FIG. 6, was constructed employing this sintered body, and two hour charging and discharging cycles with a current density of 200mA/cm$^2$ were repeated at the temperature of 300° C. Tests showed that the battery performance at the 500th cycle was similar to that of the initial condition.

EMBODIMENT 4

Instead of tantalum and tantalum compounds as in the present invention, titanium oxide (TiO$_2$) or the like was added to beta-alumina powder to obtain a sintered body.

Namely, beta-alumina powder was employed as in the Embodiment 1, and 1% of any one of titanium oxide (TiO$_2$), magnesium oxide (MgO), vanadium pentoxide (V$_2$O$_5$), niobium pentoxide (Nb$_2$O$_5$) or nickel hydroxide (Ni(OH)$_2$) was added thereto. The powders were ground and mixed to obtain a powder mixture having average particle diameter of about 0.6 $\mu$. Then, it was press-formed under the pressure of 700 kg/cm$^2$ into a test tube-shaped body. This formed body was put into a powder mixture of alpha-alumina and Na$_2$CO$_3$ and heated at the temperature of 1700° C for 10 hours to obtain a sintered body. Its density was about 3.15 g/cm$^3$ in case of TiO$_2$, and in the cases of MgO, V$_2$O$_5$, Nb$_2$O$_5$, Ni(OH)$_2$, it was lower than the above, i.e., 2.9 to 3.0 g/cm$^3$.

Next, a sodium-sulfur storage battery, as in FIG. 6, was constructed employing the sintered body in which TiO$_2$ was included, and the charge-discharge cycles and tests were carried out under the same conditions as in the case in which only beta-alumina powder was employed described under Embodiment 1. The result was that the measured terminal voltage curves were nearly equal to those found for the case in which only beta-alumina powder was employed (FIG. 2), but at the 48th cycle, the curves showed the same tendency as at the 52nd cycle of the case in which only beta-alumina powder was employed, and the charge-discharge cycle could not be repeated any more. The broken surface of the sintered body used was found to be the same as that of the case in which only beta-alumina powder was employed (FIG. 4).

As apparent from the description of the above embodiments, a beta-alumina sintered body including tantalum has superior durability with respect to ion-permeability. Further, the addition of tantalum, tantalum oxide and/or tantalum hydroxide enables sintering at a low temperature, and a sintered body of high density can be obtained even by using beta-alumina powder of large particle diameters.

In the preceding explanation, beta-alumina has been described as a crystalline material having the chemical formula Na$_2$O.11Al$_2$O$_3$, but it is known that beta-alumina having the chemical formula Na$_2$O.nAl$_2$O$_3$ in which 6 $\leq$ n < 11 also has permeability to sodium and potassium ions. Therefore, the addition of tantalum to Na$_2$O.nAl$_2$O$_3$ yields the same effect as in the case of Na$_2$O.11Al$_2$O$_3$.

Accordingly, the use of Na$_2$O.nAl$_2$O$_3$ in substitution for Na$_2$O.11Al$_2$O$_3$ or K$_2$O.11Al$_2$O$_3$ or K$_2$O.nAl$_2$O$_3$ is within the scope of the present invention and the appended claims.

I claim:

1. A method for producing a tantalum-containing sintered polycrystal beta-alumina article which is permeable to sodium and potassium ions and wherein the tantalum is distributed mainly at the grain boundaries of the beta-alumina single crystals, comprising the steps of mixing beta-alumina powder and a tantalum containing powder material selected from the group consisting of tantalum, tantalum oxide, tantalum hydroxide and mixtures thereof, the amount of tantalum in said tantalum containing material being 0.1 to 10% by weight of said beta-alumina powder, forming said mixed powders to a desired shape, and heating the same for sintering.

2. A method for producing a sintered alumina article permeable to sodium and potassium ions according to claim 1, wherein the average particle diameter of said beta-alumina powder is 1 to 10 $\mu$.

3. A method for producing a sintered alumina article permeable to sodium and potassium ions according to claim 1, wherein said formed body is heated for sintering at a temperature ranging between 1450° C and 1800° C.

4. A method for producing a sintered alumina article permeable to sodium and potassium ions according to claim 1, wherein said formed body is heated for sintering in an atmosphere containing a vapor of sodium oxide.

5. A method for producing a sintered alumina article permeable to sodium and potassium ions according to claim 1, wherein said formed body is heated for sintering in an atmosphere containing a vapor of potassium oxide.

6. A method for producing a sintered alumina article permeable to sodium and potassium ions according to claim 4, wherein said vapor is prepared by heating a sodium containing material selected from the group consisting of Na, $Na_2CO_3$, $Na_2O_2$ and $NaAlO_2$.

7. A method for producing a sintered alumina article permeable to sodium and potassium ions according to claim 5, wherein said vapor is prepared by heating a potassium containing material selected from the group consisting of K, $K_2CO_3$, $K_2O_2$ and $KAlO_2$.

8. A method for producing a sintered alumina article permeable to sodium and potassium ions according to claim 1, wherein said formed body is packed in a mixed powder of alpha-alumina and $Na_2CO_3$ before the step of heating for sintering.

9. A method according to claim 1, wherein the beta-alumina powder has an average particle diameter of from 1 to 10 microns and heating is effected within a temperature range of from 1450° to 1800° C.

* * * * *